United States Patent
Baba

(10) Patent No.: US 11,424,487 B2
(45) Date of Patent: Aug. 23, 2022

(54) SOLID-STATE BATTERY

(71) Applicant: Murata Manufacturing Co., Ltd., Nagaokakyo (JP)

(72) Inventor: Akira Baba, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 307 days.

(21) Appl. No.: 16/898,475

(22) Filed: Jun. 11, 2020

(65) Prior Publication Data
US 2020/0303781 A1    Sep. 24, 2020

Related U.S. Application Data

(63) Continuation of application No. PCT/JP2019/006704, filed on Feb. 22, 2019.

(30) Foreign Application Priority Data

Mar. 2, 2018  (JP) .............................. JP2018-037226

(51) Int. Cl.
| | |
|---|---|
| *H01M 10/0585* | (2010.01) |
| *H01M 4/587* | (2010.01) |
| *H01M 10/0525* | (2010.01) |
| *H01M 50/54* | (2021.01) |
| *H01M 4/02* | (2006.01) |

(52) U.S. Cl.
CPC ....... *H01M 10/0585* (2013.01); *H01M 4/587* (2013.01); *H01M 10/0525* (2013.01); *H01M 50/54* (2021.01); *H01M 2004/027* (2013.01)

(58) Field of Classification Search
CPC ......... H01M 10/0585; H01M 10/0525; H01M 4/587; H01M 50/54; H01M 2004/027
See application file for complete search history.

(56) References Cited

U.S. PATENT DOCUMENTS

| | | | |
|---|---|---|---|
| 9,190,652 B2 | 11/2015 | Hayashi et al. | |
| 2013/0149593 A1* | 6/2013 | Hayashi | H01M 10/044 |
| | | | 429/160 |

FOREIGN PATENT DOCUMENTS

| | | |
|---|---|---|
| JP | 2013127861 A | 6/2013 |
| JP | 2014192041 A | 10/2014 |
| JP | 2016001601 A | 1/2016 |
| WO | 2012020699 A1 | 2/2012 |

OTHER PUBLICATIONS

International Search Report issued for PCT/JP2019/006704, dated May 7, 2019.
Written Opinion of the International Searching Authority issued for PCT/JP2019/006704, dated May 7, 2019.

* cited by examiner

*Primary Examiner* — Jayne L Mershon
(74) *Attorney, Agent, or Firm* — ArentFox Schiff LLP

(57) ABSTRACT

A solid-state battery having a battery body that includes a functional portion, a first edge portion, and a second edge portion. The functional portion is a portion where first and second internal electrodes and a solid electrolyte layer overlap each other in a thickness direction. The first edge portion is a portion where the first internal electrode, the solid electrolyte layer, and a second insulating layer overlap each other in the thickness direction. The second edge portion is a portion at which the second internal electrode, the solid electrolyte layer, and a first insulating layer overlap each other in the thickness direction. Each of thicknesses of the first and second edge portions are greater than a thickness of the functional portion.

16 Claims, 2 Drawing Sheets

SOLID-STATE BATTERY

CROSS REFERENCE TO RELATED APPLICATIONS

The present application is a continuation of International application No. PCT/JP2019/006704, filed Feb. 22, 2019, which claims priority to Japanese Patent Application No. 2018-037226, filed Mar. 2, 2018, the entire contents of each of which are incorporated herein by reference.

FIELD OF THE INVENTION

The present invention relates to a solid-state battery.

BACKGROUND OF THE INVENTION

In the related art, a solid-state battery that does not use an electrolytic solution is known (for example, Patent Document 1). Since the solid-state battery does not use the electrolytic solution, there are advantages that the solid-state battery can be used in a high-temperature atmosphere and has excellent safety.

As a result of earnest research, the present inventors have found that cracks occur in the solid-state battery during charging, and have arrived at the present invention based on this research.

Patent Document 1: Japanese Patent Application Laid-Open No. 2014-192041

SUMMARY OF THE INVENTION

A main object of the present invention is to provide a solid-state battery in which cracks hardly occur.

A solid-state battery according to an aspect of the present invention includes a battery body. The battery body includes first and second main surfaces that extend along a length direction and a width direction of the battery body; first and second side surfaces that extend along the length direction and a thickness direction of the battery body; first and second end surfaces that extend along the width direction and the thickness direction of the battery body; a first internal electrode that extends along the length direction and the width direction, has a first end portion that reaches the first end surface, and has a second end portion that does not reach the second end surface; a second internal electrode that extends along the length direction and the width direction, faces the first internal electrode in the thickness direction, has a first end portion that reaches the second end surface, and has a second end portion that does not reach the first end surface; a solid electrolyte layer between the first internal electrode and the second internal electrode, and extends from the first end surface to the second end surface; a first insulating layer that extends between the second end surface and the second end portion of the first internal electrode; and a second insulating layer that extends between the first end surface from the second end portion of the second internal electrode. The battery body defines a functional portion at which the first and second internal electrodes and the solid electrolyte layer overlap in the thickness direction; a first edge portion at which the first internal electrode, the solid electrolyte layer, and the second insulating layer overlap in the thickness direction; and a second edge portion at which the second internal electrode, the solid electrolyte layer, and the first insulating layer overlap in the thickness direction. Each of thicknesses of the first and second edge portions is greater than a thickness of the functional portion.

DETAILED DESCRIPTION OF THE INVENTION

Figure 1:
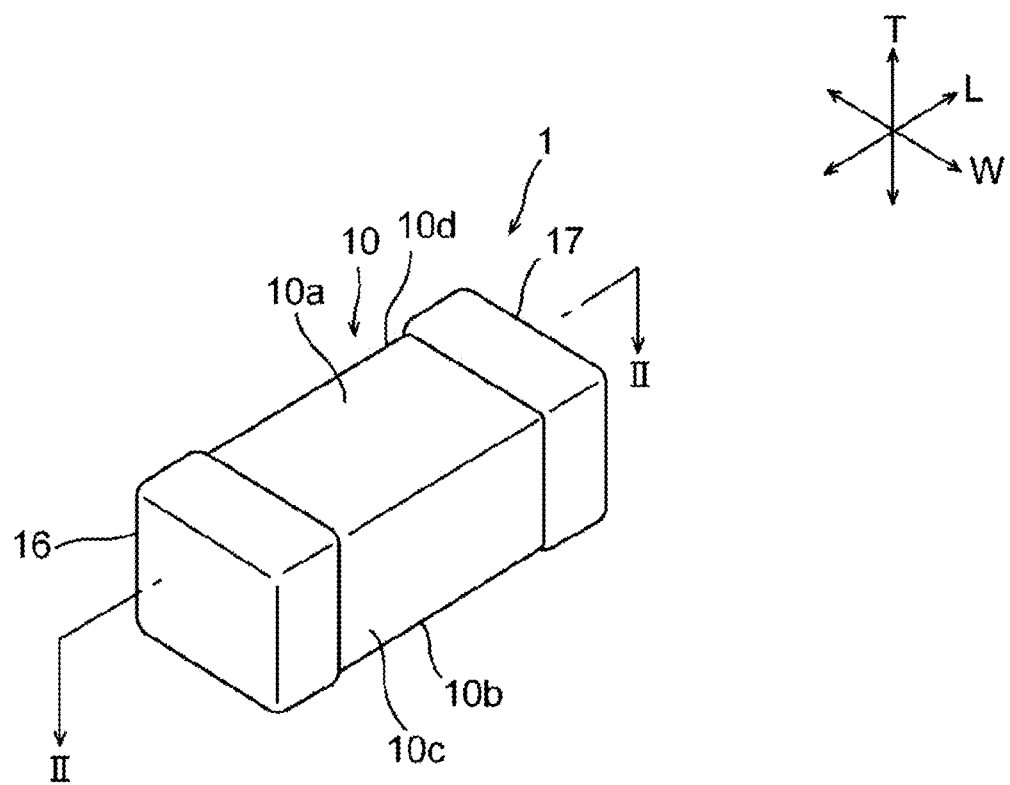
FIG. 1 is a schematic perspective view of a solid-state battery according to an embodiment of the present invention.

Hereinafter, an example of a preferred embodiment of the present invention will be described. However, the following embodiment is merely an example. The present invention is not at all limited to the following embodiment.

In the drawings to be referred to in the embodiment, members having substantially the same function are referred to by the same reference symbols. The drawings to be referred to in the embodiment are schematically described. A ratio of dimensions of objects drawn in the drawings may be different from a ratio of dimensions of actual objects. The ratio of the dimensions of the objects may differ between the drawings. A specific ratio of dimensions of the objects needs to be determined in consideration of the following description.

Figure 2:
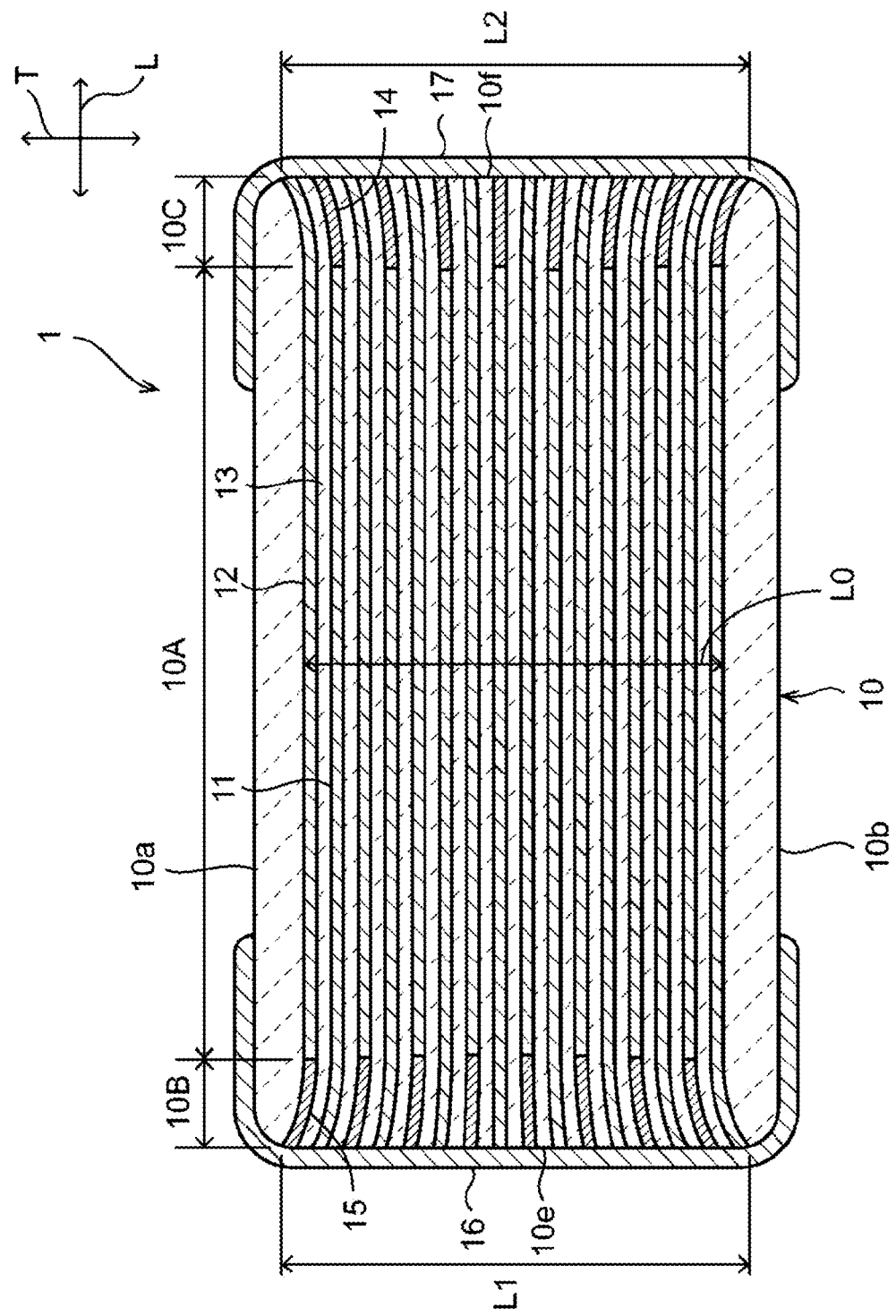
FIG. 2 is a schematic sectional view taken along line II-II of FIG. 1.

FIG. 1 is a schematic perspective view of a solid-state battery 1 according to the present embodiment. FIG. 2 is a schematic sectional view taken along line II-II of FIG. 1.

The solid-state battery 1 illustrated in FIGS. 1 and 2 is a battery in which all constituent elements are solid by using a solid electrolyte as an electrolyte and not using a liquid electrolytic solution. In the present embodiment, specifically, an example in which the solid-state battery 1 is a solid-state lithium-ion secondary battery will be described. The solid-state battery according to the present invention may be a lithium-ion secondary battery in which a capacity of a negative electrode is obtained by storing and emitting lithium ions, or may be a lithium metal secondary battery in which the capacity of the negative electrode is obtained by depositing and dissolving lithium metal. The solid-state battery according to the present invention may also be a solid-state battery other than a lithium-ion secondary battery.

The solid-state battery 1 includes a battery body 10. The battery body 10 has a substantially rectangular parallelepiped shape. The "rectangular parallelepiped shape" includes a rectangular parallelepiped shape of which corners and ridges are chamfered or rounded.

The battery body 10 has first and second main surfaces 10a and 10b, first and second side surfaces 10c and 10d, and first and second end surfaces 10e and 10f. The first and second main surfaces 10a and 10b extend along a length direction L and a width direction W. The first and second side surfaces 10c and 10d extend along the length direction L and a thickness direction T. The first and second end surfaces 10e and 10f extend along the width direction W and the thickness direction T.

As illustrated in FIG. 2, the battery body 10 includes a positive electrode 11 forming a first internal electrode, a negative electrode 12 forming a second internal electrode, a solid electrolyte layer 13, a first insulating layer 14, and a second insulating layer 15.

The positive electrode 11 extends along the length direction L and the width direction W. The positive electrode 11 reaches the first end surface 10e. The positive electrode 11 does not reach the second end surface 10f and an end portion of the positive electrode 11 on the second end surface 10f side is separated from the second end surface 10f.

The positive electrode 11 may be composed of a positive electrode active material layer, or may be composed of a positive electrode current collector and a positive electrode active material layer formed on the positive electrode current collector.

The positive electrode active material layer contains one kind or two or more kinds of positive electrode active materials and a solid electrolyte.

The positive electrode active material is, for example, a material capable of storing and emitting lithium ions which are electrode reactants. The positive electrode active material is preferably a lithium-containing compound from the viewpoint of obtaining a high energy density, but is not limited thereto.

The lithium-containing compound is, for example, a composite oxide (lithium transition metal composite oxide) that contains, as constituent elements, lithium and a transition metal element, or a phosphoric acid compound (lithium transition metal phosphoric acid compound) that contains, as constituent elements, lithium and a transition metal element. Among these compounds, the lithium-containing compound that contains at least one kind of fiber metal element selected from the group consisting of Co, Ni, Mn, and Fe is preferably used. This is because a voltage of the solid-state battery 1 can be higher.

Specific examples of the lithium transition metal composite oxide preferably used include $LiCoO_2$, $LiNiO_2$, $LiVO_2$, $LiCrO_2$, and $LiMn_2O_4$.

Specific examples of the lithium transition metal phosphoric acid compound preferably used include $LiFePO_4$ and $LiCoPO_4$.

In the positive electrode 11, the positive electrode active material is present as a positive electrode active material particle. At least a part of a surface of the positive electrode active material particle may be coated with a coating agent. The coating agent is, for example, at least one kind of a solid electrolyte and a conductive agent. An interface resistance between the positive electrode active material particle and the solid electrolyte can be reduced by coating the surface of the positive electrode active material particle with the coating agent. Since collapse of a structure of the positive electrode active material particle can be suppressed, a sweep potential width can be widened. Thus, a large amount of lithium can be used for reaction, and cycle characteristics can be improved.

The positive electrode active material layer may further contain a binder and a conductive agent if necessary. The positive electrode active material may have a function as a binder.

Examples of the conductive agent preferably used include a carbon material, metal, a metal oxide, and a conductive polymer. The positive electrode active material layer may contain only one kind of these conductive agents, or may contain a plurality of kinds of conductive agents.

Examples of the carbon material include graphite, carbon fiber, carbon black, and carbon nanotube. The conductive agent may be any material as long as the material has conductivity, and is not limited to the aforementioned examples.

The negative electrode 12 extends along the length direction L and the width direction W. The negative electrode 12 faces the positive electrode 11 in the thickness direction T. The negative electrode 12 reaches the second end surface 10f. The negative electrode 12 does not reach the first end surface 10e and an end portion of the negative electrode 12 on the first end surface 10e side is separated from the first end surface 10e.

The negative electrode 12 may be composed of a negative electrode active material layer, or may be composed of a negative electrode current collector and a negative electrode active material layer formed on the negative electrode current collector.

The negative electrode active material layer contains one kind or two or more kinds of negative electrode active materials and a solid electrolyte. The negative electrode active material is a material capable of storing and emitting lithium ions which are electrode reactants. The negative electrode active material is preferably a carbon material from the viewpoint of obtaining a high energy density, but is not limited thereto. Specific examples of the carbon material preferably used include, for example, graphitizing carbon, non-graphitizing carbon, graphite, mesocarbon microbead (MCMB), and graphite such as highly oriented graphite (HOPG).

The negative electrode active material layer may further contain a binder and a conductive agent if necessary. The negative electrode active material may have a function as a binder. Examples of the conductive agent preferably used include the same conductive agent preferably used in the positive electrode active material layer.

In the negative electrode 12, the negative electrode active material is present as a negative electrode active material particle. At least a part of a surface of the negative electrode active material particle may be coated with a coating agent. The coating agent is, for example, at least one kind of a solid electrolyte and a conductive agent. An interface resistance between the negative electrode active material particle and the solid electrolyte can be reduced by coating the surface of the negative electrode active material particle with a coating agent. Since collapse of a structure of the negative electrode active material particle can be suppressed, a sweep potential width can be widened. Thus, a large amount of lithium can be used for reaction, and cycle characteristics can be improved.

The solid electrolyte layer 13 is formed between the positive electrode 11 and the negative electrode 12 in the thickness direction T. The solid electrolyte layer 13 is formed so as to extend from the first end surface 10e to the second end surface 10f.

The solid electrolyte layer 13 can be made of, for example, an oxide glass-based lithium-ion conductor. Here, the "oxide glass-based lithium-ion conductor" refers to a lithium-ion conductor composed of oxide glass. The oxide glass-based lithium-ion conductor is preferably glass that contains one or more of germanium (Ge), silicon (Si), boron (B), and phosphorus (P), lithium (Li), and oxygen (O), and is more preferably glass that contains silicon (Si), boron (B), lithium (Li), and oxygen (O). Here, the "glass" means a crystallographically amorphous substance in which halo is observed in X-ray diffraction or electron beam diffraction.

In the oxide glass-based lithium-ion conductor, the content of $Li_2O$ is 20 mol % to 75 mol %, preferably m 25 mol % to 75 mol %, more preferably 30 mol % to 75 mol %, and still more preferably 40 mol % to 75 mol %, and particularly preferably 50 mol % to 75 mol %. When the oxide glass-based lithium-ion conductor contains $GeO_2$, the content of $GeO_2$ is preferably more than 0 mol % and 80 mol % or less. When the oxide glass-based lithium-ion conductor contains $SiO_2$, the content of $SiO_2$ is preferably more than 0 mol % and 70 mol % or less. When the oxide glass-based lithium-ion conductor contains $B_2O_3$, the content of $B_2O_3$ is preferably more than 0 mol % and 60 mol % or less. When the oxide glass-based lithium-ion conductor contains $P_2O_5$, the content of $P_2O_5$ is preferably more than 0 mol % and 50 mol % or less. The content of each oxide can be measured by using inductively coupled plasma atomic emission spectroscopy (ICP-AES).

The oxide glass-based lithium-ion conductor may further contain an additive element if necessary. Examples of the additive element include one or more kinds selected from the group consisting of sodium (Na), magnesium (Mg), aluminum (Al), potassium (K), calcium (Ca), titanium (Ti), vanadium (V), chromium (Cr), manganese (Mn), iron (Fe), cobalt (Co), nickel (Ni), copper (Cu), zinc (Zn), gallium (Ga), selenium (Se), rubidium (Rb), sulfur (S), yttrium (Y), zirconium (Zr), niobium (Nb), molybdenum (Mo), silver (Ag), indium (In), tin (Sn), antimony (Sb), cesium (Cs), barium (Ba), hafnium (Hf), tantalum (Ta), tungsten (W), lead (Pb), bismuth (Bi), gold (Au), lanthanum (La), neodymium (Nd), and europium (Eu).

A lithium-ion conductivity of the oxide glass-based lithium-ion conductor is preferably $5 \times 10_{-7}$ S/cm or more.

Examples of a method for manufacturing the oxide glass-based lithium-ion conductor include a method for melting a raw material to a melt and cooling the melt, a method for pressing the melt with a metal plate or a roll, a mechanical milling method, and a sol-gel method.

The first insulating layer 14 is formed so as to extend between the second end surface 10f and the end portion of the positive electrode 11 on the second end surface 10f side.

The second insulating layer 15 is formed so as to extend between the first end surface 10e and the end portion of the negative electrode 12 on the first end surface 10e side.

The first and second insulating layers 14 and 15 do not contain an active material, and do not have substantially ionic conductivity. Each of the first and second insulating layers 14 and 15 can be made of, for example, the same material as that of the solid electrolyte layer 13. Each of the first and second insulating layers 14 and 15 may further contain, for example, an insulating inorganic powder as an aggregate in addition to the same material as that of the solid electrolyte layer 13.

Specific examples of a preferable aggregate include aluminum oxide, zirconium oxide, silicon oxide, and S—B—Na-based glass frit.

A first external electrode (positive electrode terminal electrode) 16 is provided on the first end surface 10e of the battery body 10. In the present embodiment, specifically, the first external electrode 16 is provided so as to reach the first and second main surfaces 10a and 10b and the first and second side surfaces 10c and 10d from the first end surface 10e. The first external electrode 16 is electrically connected to the positive electrode 11 on the first end surface 10e.

A second external electrode (negative electrode terminal electrode) 17 is provided on the second end surface 10f of the battery body 10. In the present embodiment, specifically, the second external electrode 17 is provided so as to reach the first and second main surfaces 10a and 10b and the first and second side surfaces 10c and 10d from the second end surface 10f. The second external electrode 17 is electrically connected to the negative electrode 12 on the second end surface 10f.

The first and second external electrodes 16 and 17 each include a conductive material such as a metal material. Examples of the metal material preferably used include Ag, Au, Pt, Al, Cu, Sn, Ni, and alloys containing these metals. The first and second external electrodes 16 and 17 each may further contain a binder and a solid electrolyte in addition to the conductive material.

The battery body 10 includes a functional portion 10A, a first edge portion 10B, and a second edge portion 10C.

The functional portion 10A is a portion that expresses a function of the solid-state battery 1. The function is charging and discharging of the solid-state battery 1. The functional portion 10A is a portion at which the positive electrode (first internal electrode) 11, the negative electrode (second internal electrode) 12, and the solid electrolyte layer 13 overlap each other in the thickness direction. In the functional portion 10A, the positive electrode 11 and the negative electrode 12 face each other with the solid electrolyte layer 13 interposed therebetween.

The first end edge portion 10B is a portion located on the first end surface 10e side of the functional portion 10A. The first edge portion 10B is a portion at which the positive electrode (first internal electrode) 11, the solid electrolyte layer 13, and the second insulating layer 15 overlap each other in the thickness direction. The negative electrode 12 is not provided on the first edge portion 10B. Thus, the charging and discharging are not substantially performed at the first edge portion 10B.

The second end edge portion 10C is a portion located on the second end surface 10f side of the functional portion 10A. The second edge portion 10C is a portion at which the negative electrode (second internal electrode) 12, the solid electrolyte layer 13, and the first insulating layer 14 overlap each other in the thickness direction. The positive electrode 11 is not provided on the second edge portion 10C. Thus, the charging and discharging are not substantially performed at the second edge portion 10C.

As a result of earnest research, the present inventors have found that cracks occur in the solid-state battery during charging, and have completed the present invention based on this research. As a result of further earnest research, the present inventors have found that the cause is that the positive electrode 11 and the negative electrode 12 expand due to the expansion of the active material during charging of the solid-state battery 1. Specifically, during the charging of the solid-state battery 1, the positive electrode 11 and the negative electrode 12 expand, while the first and second insulating layers 14 and 15 do not expand. Thus, a stress is generated at interfaces between the functional portion 10A at which the positive electrode 11 and the negative electrode 12 are provided and the charging is performed and the first and second edge portions 10B and 10C at which the first and second insulating layers 14 and 15 are formed and the charging is not performed. Since the stress is generated at the interfaces between the functional portion 10A and the first and second edge portions 10B and 10C whenever the charging is performed, there is a concern that the cracks occur in the solid-state battery 1 due to this stress.

In the solid-state battery 1 according to the present embodiment, each of thicknesses L1 and L2 of the first and second edge portions 10B and 10C is greater than a thickness L0 of the functional portion 10A. The present inventors have found that the cracks are unlikely to occur in the solid-state battery 1 by doing this. Thus, according to the present embodiment, it is possible to effectively suppress the occurrence of the cracks, and it is possible to realize the solid-state battery 1 having excellent reliability. However, when each of the thicknesses L1 and L2 of the first and second edge portions 10B and 10C is much greater than the thickness L0 of the functional portion 10A, the cracks may occur. Accordingly, each of the thicknesses L1 and L2 of the first and second edge portions 10B and 10C is preferably 1.01 times to 1.2 times of the thickness L0 of the functional portion 10A, and more preferably 1.01 times to 1.15 times of the thickness L0 of the functional portion 10A.

(Thickness L0 of functional portion 10A)

The thickness L0 of the functional portion 10A can be measured in the following manner. A measurer observes the solid-state battery 1 from the side surface by X-ray CT, and measures a distance between an upper surface and a lower surface of the functional portion 10A (a distance along the thickness direction T) at a center in the length direction L. This distance is the thickness L0 of the functional portion 10A. The upper surface of the functional portion 10A is a surface on the first main surface 10a side of the internal electrode located closest to the first main surface 10a side. The lower surface of the functional portion 10A is a surface on the second main surface 10b side of the internal electrode located closest to the second main surface 10b side.

(Thickness L1 of first edge portion 10B)

The thickness L1 of the first edge portion 10B can be measured in the following manner. The measurer observes the solid-state battery 1 from the side surface by X-ray CT, and measures a distance between an upper surface and a lower surface of the first edge portion 10B (a distance along the thickness direction T) on the first end surface 10e. This distance is the thickness L1 of the first edge portion 10B. The upper surface of the first edge portion 10B is a surface of a layer located closest to the first main surface 10a on the first main surface 10a side among the layers (internal electrodes and insulating layers) constituting the first edge portion 10B. The lower surface of the first edge portion 10B is a surface of a layer located closest to the second main surface 10b on the second main surface 10b side among the layers (internal electrodes and insulating layers) constituting the first edge portion 10B.

(Thickness L2 of Second Edge Portion 10C)

The thickness L2 of the second edge portion 10C can be measured in the following manner. The measurer observes the solid-state battery 1 from the side surface by X-ray CT, and measures a distance between an upper surface and a lower surface of the second edge portion 10C (a distance along the thickness direction T) on the second end surface 10f. This distance is the thickness L2 of the second edge portion 10C. The upper surface of the second edge portion 10C is a surface on the first main surface 10a side of a layer located closest to the first main surface 10a among the layers (internal electrodes and insulating layers) constituting the second edge portion 10C.

The lower surface of the second edge portion 10C is a surface on the second main surface 10b side of a layer located closest to the second main surface 10b among the layers (internal electrodes, insulating layers) constituting the second edge portion 10C.

(Method for manufacturing solid-state battery 1)

Next, an example of a method for manufacturing the solid-state battery 1 will be described.

(Preparation of solid electrolyte green sheet)

A solid electrolyte green sheet is formed as follows. A slurry is obtained by mixing a lithium-ion conductor (solid electrolyte), an organic-based binder, and optionally an additive and dispersing the mixture in an organic solvent. Examples of the organic binder include an organic-based binder such as an acrylic resin. The solvent is not particularly limited, but a solvent that burns off in a temperature range lower than a firing temperature of the green sheet is preferably used. Specific examples of the solvent include, for example, lower alcohols having 4 or less carbon atoms such as methanol, ethanol, isopropanol, n-butanol, sec-butanol, and t-butanol, aliphatic glycols such as ethylene glycol, propylene glycol(1,3-propanediol), 1,3-propanediol, 1,4-butanediol, 1,2-butanediol, 1,3-butanediol, and 2-methyl-1,3-propanediol, ketones such as methyl ethyl ketone, amines such as dimethylethylamine, and alicyclic alcohols such as terpineol can be used alone or in combination of two or more kinds. Examples of the dispersion treatment method include a stirring treatment method, an ultrasonic dispersion treatment method, a bead dispersion treatment method, a kneading treatment method, and a homogenizer treatment method.

If necessary, the slurry may be filtered by a filter, and a foreign matter in the slurry may be removed. If necessary, vacuum deforming for removing air bubbles inside may be performed on the slurry.

The solid electrolyte green sheet may be obtained by uniformly applying and printing a solid electrolyte slurry prepared in this manner on a surface of a support substrate and further drying the solid electrolyte slurry. Examples of the support substrate include a polymer resin film such as a polyethylene terephthalate (PET) film. Examples of the coating method include a die coating method, a micro gravure coating method, a wire bar coating method, a direct gravure coating method, a reverse roll coating method, a comma coating method, a knife coating method, a spray coating method, a curtain coating method, a dipping method, and a spin coating method. Examples of the printing method include a letterpress printing method, an offset printing method, a gravure printing method, an intaglio printing method, a rubber plate printing method, and a screen printing method.

In order to easily peel off the solid electrolyte green sheet from the surface of the support substrate, a peeling treatment is preferably performed on the surface of the support substrate in advance. Examples of the peeling treatment include a method for applying or printing a composition that gives peelability onto the surface of the support substrate in advance. Examples of the composition that gives the peelability include a coating material that contains a binder as a main component and contains wax or fluorine, or a silicone resin.

(Preparation of positive electrode paste)

Next, a method for preparing a positive electrode paste will be described. The positive electrode paste is obtained by mixing a positive electrode active material, a lithium-ion conductor (solid electrolyte), an organic-based binder, and optionally a conductive agent and dispersing the mixture in an organic solvent. Examples of the dispersion method include a roll dispersion method, a stirring treatment method, an ultrasonic dispersion treatment method, a bead dispersion treatment method, a kneading treatment method, and a homogenizer treatment method.

(Preparation of negative electrode paste)

Next, a method for preparing a negative electrode paste will be described. The negative electrode paste is obtained by mixing a negative electrode active material, a lithium-ion conductor (solid electrolyte), an organic-based binder, and optionally a conductive agent and dispersing the mixture in an organic solvent.

(Preparation of current collection paste)

A method for preparing a current collection paste is the same as the method for preparing the positive electrode paste except that a conductive agent is used instead of the positive electrode active material.

(Insulating paste)

An insulating paste is prepared by mixing a low melting point glass, an aggregate, and an organic-based binder and dispersing the mixture in an organic solvent. A glass transition temperature of the low melting point glass is desirably lower than the firing temperature. The low melting point glass may be made of the same material as that of the lithium-ion conductor, or may be made of a different material.

(Preparation of positive electrode sheet)

A positive electrode sheet is obtained by printing the positive electrode paste, the insulating paste, and the current collection paste on the surface of the solid electrolyte green sheet. At this time, the insulating paste is printed thicker than the positive electrode paste. The printing of the current collection paste is not essential. Examples of the printing method include a letterpress printing method, an offset printing method, a gravure printing method, an intaglio printing method, a rubber plate printing method, and a screen printing method.

(Preparation of negative electrode sheet)

A negative electrode sheet is obtained by printing the negative electrode paste and the insulating paste on the surface of the solid electrolyte green sheet. At this time, the insulating paste is printed thicker than the negative electrode paste.

(Preparation of laminate)

A laminate is prepared by laminating a plurality of solid electrolyte green sheets, alternately laminating the obtained positive electrode sheet and negative electrode sheet, further laminating a plurality of solid electrolyte green sheets, and applying a pressure to these sheets in the thickness direction to adhere to each other. When the pressure is applied, a temperature of 30° C. or more and 90° C. or less is desirably applied. Accordingly, the organic-based binder contained in each green sheet constituting the laminate is melted, and adhesion between the green sheets constituting the laminate is improved. Specific examples of the method for pressing the laminate while heating the laminate include a hot pressing method and a warm isostatic pressing (WIP).

(Firing of laminate)

Subsequently, the laminate is cut into a predetermined size and shape if necessary. Subsequently, the laminate is fired, and thus, the organic-based binder contained in each green sheet constituting the laminate is degreased. A laminated solid-state battery sintered body is obtained by inserting the degreased laminate in a mold and heating the degreased laminate while applying a pressure to the degreased laminate at least in the thickness direction. The firing temperature is preferably 300° C. or more and 600° C. or less, and more preferably 350° C. or more and 500° C. or less.

Since the laminate is fired while being pressed by a rigid body, upper and lower surfaces of the fired body are flat, and bending caused by a difference in a printing thickness between the functional portion and the edge portions is observed in an inner structure of the fired body.

Hereinafter, the present invention will be described in more detail based on specific examples, but the present invention is not limited to the following examples, and can be performed by appropriately changing the scope without changing the gist thereof.

EXAMPLES 1 to 15, COMPARATIVE EXAMPLES 1 to 4

30 solid-state batteries in which the thicknesses of the functional portion 10A, the first edge portion 10B, and the second edge portion 10C are different were prepared under the following conditions by using the aforementioned manufacturing method.

Positive electrode active material: lithium cobalt oxide
Negative electrode active material: graphite
Conductive agent: acetylene black
Low melting point glass: glass similar to the lithium-ion conductor used for the solid electrolyte layer
Aggregate: alumina
Configuration of laminate: 15 positive electrode sheets and 16 negative electrode sheets are alternately laminated on six solid electrolyte green sheets, and six solid electrolyte green sheets are further laminated thereon (thickness measurement)

An internal structure of a sample before a charging and discharging test was imaged by X-ray CT, and the thicknesses of the first and second edge portions and the functional portion were measured.

(Charging and discharging test)

Constant-current charging was performed on samples prepared in the examples and the comparative examples at 25° C. with 10 mA until reaching 4.2 V, and constant-voltage charging was performed on the samples after reaching 4.2V for 2 hours. Thereafter, the samples were discharged at 25° C. with a constant current of 10 mA and a cutoff voltage of 2V. 30 cycles of charging and discharging were performed with the above charging and discharging test as one cycle.

(Observation of cracks)

The cracks were observed in the samples on which the charging and discharge test was performed by X-ray CT and polishing. Table 1 shows the results.

TABLE 1

| | Functional portion Thickness (actual dimension ($\mu$m)) | First edge portion Thickness (actual dimension ($\mu$m))/Ratio to thickness of functional portion | Second edge portion Thickness (actual dimension ($\mu$m))/Ratio to thickness of functional portion | Number of detected cracks/ number of samples |
|---|---|---|---|---|
| Comp. Ex. 1 | 975 | 870 0.892 | 945 0.969 | 4/30 |
| Comp. Ex. 2 | 975 | 966 0.991 | 945 0.969 | 2/30 |
| Example 1 | 975 | 1005 1.031 | 990 1.015 | 0/30 |
| Example 2 | 975 | 1020 1.046 | 1005 1.031 | 0/30 |
| Example 3 | 975 | 1035 1.062 | 1020 1.046 | 0/30 |
| Example 4 | 975 | 1058 1.085 | 1035 1.062 | 0/30 |
| Example 5 | 975 | 1080 1.108 | 1050 1.077 | 0/30 |
| Example 6 | 975 | 1080 1.108 | 1065 1.092 | 0/30 |
| Example 7 | 975 | 1080 1.108 | 1080 1.108 | 0/30 |
| Example 8 | 975 | 1110 1.138 | 1095 1.123 | 0/30 |
| Comp. Ex. 3 | 1820 | 1736 0.954 | 1764 0.969 | 8/30 |
| Comp. Ex. 4 | 1820 | 1789 0.983 | 1764 0.969 | 5/30 |
| Example 9 | 1820 | 1848 1.015 | 1848 1.015 | 0/30 |
| Example 10 | 1820 | 1876 1.031 | 1876 1.031 | 0/30 |
| Example 11 | 1820 | 1960 1.077 | 1904 1.046 | 0/30 |
| Example 12 | 1820 | 2016 1.108 | 1932 1.062 | 0/30 |

TABLE 1-continued

| | Functional portion Thickness (actual dimension (µm)) | First edge portion Thickness (actual dimension (µm))/Ratio to thickness of functional portion | Second edge portion Thickness (actual dimension (µm))/Ratio to thickness of functional portion | Number of detected cracks/ number of samples |
|---|---|---|---|---|
| Example 13 | 1820 | 2044 1.123 | 1960 1.077 | 0/30 |
| Example 14 | 1820 | 2016 1.108 | 1988 1.092 | 0/30 |
| Example 15 | 1820 | 2016 1.108 | 2016 1.108 | 0/30 |

The charging and discharging test was performed on the samples prepared in the examples for 30 cycles, but even thereafter, there were no samples in which the cracks were found.

From the results shown in Table 1, it can be seen that the occurrence of the cracks can be suppressed by setting each of the thicknesses of the first and second edge portions to be greater than the thickness of the functional portion.

(Summary of Embodiment)

As a result of earnest research, the present inventors have found that the cause of the cracks during charging is that the electrode expands as carrier ions are inserted into and are removed from the electrode during charging. The present inventors have found that the cracks are less likely to occur when the thicknesses of the first and second edge portions are set to be greater than the thickness of the functional portion. It is presumed that this is because the stress acting between the first and second edge portions and the functional portion is relaxed.

In the solid-state battery according to the embodiment, the each of thicknesses of the first and second edge portions is most preferably 1.01 times to 1.15 times of the thickness of the functional portion.

In the solid-state battery according to the embodiment, the second internal electrode may contain a carbon material as a negative electrode active material.

In the solid-state battery according to the embodiment, the second internal electrode may contain graphite as the negative electrode active material.

The solid-state battery according to the embodiment may be a lithium-ion secondary battery.

Referring to FIG. 2, the solid-state battery according to the embodiment includes the battery body, the first external electrode that is formed on the first end surface and is electrically connected to the first internal electrode, and the second external electrode that is formed on the second end surface and is electrically connected to the second internal electrode. The thickness of the battery body is preferably constant (substantially constant), and the functional portion, the first edge portion, and the second edge portion are arranged inside the battery body.

Referring to FIG. 2, preferably, the thickness of the first insulating layer is greater than the thickness of the first internal electrode, and the thickness of the second insulating layer is greater than the thickness of the second internal electrode. This is because the insulating paste is printed thicker than the positive electrode paste on the surface of the fixed electrolyte green sheet and the insulating paste is printed thicker than the negative electrode paste on the surface of the fixed electrolyte green sheet.

The invention claimed is:

1. A solid-state battery comprising:
   a battery body that includes
      first and second main surfaces that extend along a length direction and a width direction of the battery body,
      first and second side surfaces that extend along the length direction and a thickness direction of the battery body,
      first and second end surfaces that extend along the width direction and the thickness direction of the battery body,
      a first internal electrode that extends along the length direction and the width direction, has a first end portion that reaches the first end surface, and has a second end portion that does not reach the second end surface,
      a second internal electrode that extends along the length direction and the width direction, faces the first internal electrode in the thickness direction, has a first end portion that reaches the second end surface, and has a second end portion that does not reach the first end surface,
      a solid electrolyte layer between the first internal electrode and the second internal electrode, and extends from the first end surface to the second end surface,
      a first insulating layer that extends between the second end surface and the second end portion of the first internal electrode, and
      a second insulating layer that extends between the first end surface and the second end portion of the second internal electrode,
   wherein the battery body defines:
      a functional portion at which the first and second internal electrodes and the solid electrolyte layer overlap in the thickness direction,
      a first edge portion at which the first internal electrode, the solid electrolyte layer, and the second insulating layer overlap in the thickness direction, and
      a second edge portion at which the second internal electrode, the solid electrolyte layer, and the first insulating layer overlap in the thickness direction, and
   each of thicknesses of the first and second edge portions is greater than a thickness of the functional portion.

2. The solid-state battery according to claim 1, wherein the thicknesses of the first and second edge portions are 1.01 times to 1.2 times of the thickness of the functional portion.

3. The solid-state battery according to claim 1, wherein the thicknesses of the first and second edge portions are 1.01 times to 1.15 times of the thickness of the functional portion.

4. The solid-state battery according to claim 1, wherein the second internal electrode contains a carbon material as a negative electrode active material.

5. The solid-state battery according to claim 4, wherein the negative electrode active material is graphite.

6. The solid-state battery according to claim 1, wherein the solid-state battery is a lithium-ion secondary battery.

7. The solid-state battery according to claim 1, further comprising:
   a first external electrode on the first end surface of the battery body and electrically connected to the positive electrode; and
   a second external electrode on the first end surface of the battery body and electrically connected to the negative electrode.

8. The solid-state battery according to claim 1, wherein a thickness of the first insulating layer is greater than a thickness of the first internal electrode, and a thickness of the second insulating layer is greater than a thickness of the second internal electrode.

9. A solid-state battery comprising:
a battery body that includes
first and second main surfaces that extend along a length direction and a width direction of the battery body,
first and second side surfaces that extend along the length direction and a thickness direction of the battery body,
first and second end surfaces that extend along the width direction and the thickness direction of the battery body,
a first internal electrode that extends along the length direction and the width direction, has a first end portion that reaches the first end surface, and has a second end portion that does not reach the second end surface,
a second internal electrode that extends along the length direction and the width direction, faces the first internal electrode in the thickness direction, has a first end portion that reaches the second end surface, and has a second end portion that does not reach the first end surface,
a solid electrolyte layer between the first internal electrode and the second internal electrode, and extends from the first end surface to the second end surface, and
an insulating layer that extends between the second end surface and the second end portion of the first internal electrode, wherein the battery body defines:
a functional portion at which the first and second internal electrodes and the solid electrolyte layer overlap in the thickness direction, and
an edge portion at which the second internal electrode, the solid electrolyte layer, and the insulating layer overlap in the thickness direction, and
the edge portion has a thickness that is greater than a thickness of the functional portion.

10. The solid-state battery according to claim 9, wherein the thicknesses of the edge portion is 1.01 times to 1.2 times of the thickness of the functional portion.

11. The solid-state battery according to claim 9, wherein the thicknesses of the edge portion is 1.01 times to 1.15 times of the thickness of the functional portion.

12. The solid-state battery according to claim 9, wherein the second internal electrode contains a carbon material as a negative electrode active material.

13. The solid-state battery according to claim 12, wherein the negative electrode active material is graphite.

14. The solid-state battery according to claim 9, wherein the solid-state battery is a lithium-ion secondary battery.

15. The solid-state battery according to claim 9, further comprising:
a first external electrode on the first end surface of the battery body and electrically connected to the positive electrode; and
a second external electrode on the first end surface of the battery body and electrically connected to the negative electrode.

16. The solid-state battery according to claim 9, wherein a thickness of the insulating layer is greater than a thickness of the first internal electrode.

* * * * *